United States Patent

Mory et al.

[11] 3,963,694
[45] June 15, 1976

[54] HYDROXYQUINOLYL- AND QUINAZOLONYLAZOACETOACETYLBENZIMIDAZOLONE PIGMENTS

[75] Inventors: Rudolf Mory, Dornach; Rolf Muller, Aesch, both of Switzerland

[73] Assignee: Ciba-Geigy Corporation, Ardsley, N.Y.

[22] Filed: Aug. 19, 1974

[21] Appl. No.: 498,830

Related U.S. Application Data

[63] Continuation-in-part of Ser. No. 230,978, March 1, 1972, abandoned.

[30] Foreign Application Priority Data
Mar. 3, 1971    Switzerland.......................... 3125/71

[52] U.S. Cl.................................. 260/154; 106/23; 106/288 Q; 260/152; 260/155; 260/156; 260/157; 260/247.5 R; 260/250 Q; 260/251 Q; 260/288 R; 260/309.2; 428/412; 428/423; 428/446; 428/492; 428/500; 428/538
[51] Int. Cl.²..................... C09B 29/36; D06P 1/08; D06P 1/44
[58] Field of Search ........... 260/152, 154, 155, 156, 260/157

[56] References Cited
UNITED STATES PATENTS

| | | | |
|---|---|---|---|
| 2,908,678 | 10/1959 | Goebel et al. ...................... | 260/154 |
| 2,993,884 | 7/1961 | Ruegg et al.......................... | 260/147 |
| 3,109,842 | 11/1963 | Schilling et al. ................... | 260/157 |
| 3,234,206 | 2/1966 | Liechti............................... | 260/155 |
| 3,609,134 | 9/1971 | Mory .................................. | 260/152 |

*Primary Examiner*—Floyd D. Higel
*Attorney, Agent, or Firm*—Vincent J. Cavalieri

[57] ABSTRACT

Azo pigments of the formula

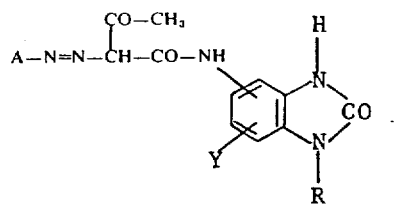

wherein A is a condensed ring system consisting of a benzene ring and a 5- or 6-membered hetero ring having nitrogen in the cyclus and a keto group, R is alkyl, cycloalkyl or aryl and Y is hydrogen, halogen, alkyl, cycloalkyl, alkoxy, aryl or nitro, and the azo group is not bonded directly to the hetero ring of the diazo component, are prepared. These pigments are useful for coloring organic material of high molecular weight, such as cellulose ethers and esters, and polyesters. Th pigments have excellent fastness to light and migration.

4 Claims, No Drawings

HYDROXYQUINOLYL- AND QUINAZOLONYLAZOACETOACETYLBENZIMIDAZOLONE PIGMENTS

This is a continuation-in-part of our copending application Ser. No. 230,978, filed Mar. 1, 1972, now abandoned.

The discovery has been made that valuable new pigments of the formula

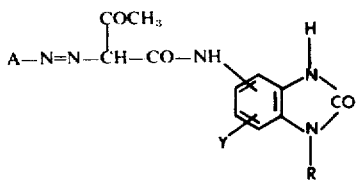  (I)

are obtained, wherein A is an aryl selected from the group

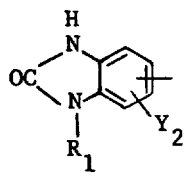 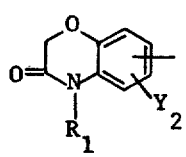

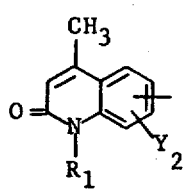 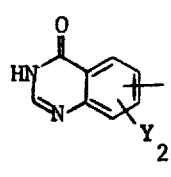

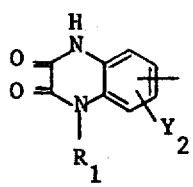 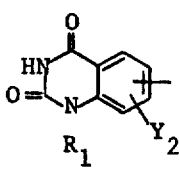

$Y_1$ and $Y_2$ is hydrogen, chloro, bromo, alkyl of 1 to 6 carbon atoms, alkoxy of 1 to 6 carbon atoms or nitro, $R_1$ is hydrogen, alkyl of 1 to 6 carbon atoms, cyclohexyl, phenyl, or phenyl substituted by chloro, methyl or methoxy, $R_2$ is alkyl of 1 to 6 carbon atoms, cyclohexyl, phenyl, or phenyl substituted by halogen, alkyl of 1 to 6 carbon atoms, or alkoxy of 1 to 6 carbon atoms by coupling a diazo or diazoamino compound of an amine of the formula

A—NH$_2$  (II)

with an acetoacetic arylide of the formula $CH_3-CO-CH_2CO-NH$   (III)

Since the dyestuffs according to the invention are pigments, they obviously must not contain water-solubilising groups, in particular acid water-solubilising groups, for example sulphonic acid or carboxylic acid groups.

Particular interest attaches to pigments of the formula I wherein A is an aryl selected from the group

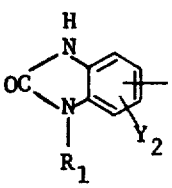 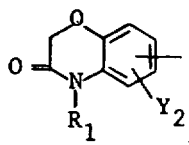

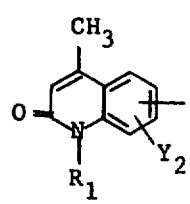 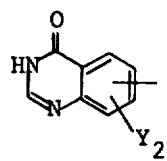

As diazo components there are used preferably:
1. Aminophenmorpholones of the formula

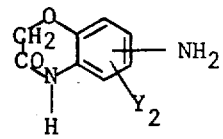  (IV)

wherein $Y_2$ has the meaning given hereinbefore.

2. Aminohydroxyquinolines, in particular those of the formula

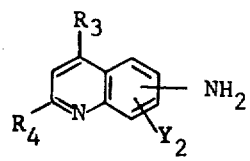  (V)

wherein $Y_2$ has the meaning given hereinbefore, one of $R_3$ or $R_4$ represents hydroxy, the other represents hydrogen, halogen, alkyl or alkoxy.

3. Aminoquinoxalones, in particular those of the formula

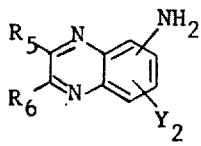

(VI)

wherein $Y_2$ has the meaning given hereinbefore, $R_5$ and $R_6$ represent hydrogen, alkyl, phenyl, alkoxy or hydroxy with at least one of $R_5$ or $R_6$ representing hydroxy.

4. Aminoquinazolones, in particular those of the formula

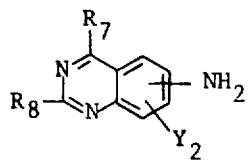

(VII)

wherein $R_7$ and $R_8$ represent hydrogen, alkyl, phenyl or hydroxy, with at least one of the radicals $R_7$ and $R_8$ representing hydroxy, and $Y_2$ has the meaning given hereinbefore.

5. Aminophenylquinazolones of the formula

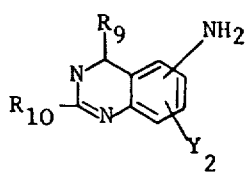

(VIII)

wherein $Y_2$ has the meaning given hereinbefore, $R_9$ and $R_{10}$ represent hydrogen, phenyl, aminophenyl, phenylamino or hydroxy, with at least one of $R_9$ and $R_{10}$ representing hydroxy.

The following may be cited as examples of the diazo components according to the invention:

5-amino-benzimidazolone
4-amino-benzimidazolone
5-amino-6-chloro-benzimidazolone
5-amino-7-chloro-benzimidazolone
5-amino-7-bromo-benzimidazolone
5-amino-6-methyl-benzimidazolone
5-amino-7-methyl-benzimidazolone
5-amino-7-methoxy-benzimidazolone
5-amino-6-ethoxy-benzimidazolone
5-amino-1-phenyl-benzimidazolone
5-amino-1-(4'-chlorophenyl)-benzimidazolone
5-amino-1-(4'-methylphenyl)-benzimidazolone
5-amino-1-(4'-methoxyphenyl)-benzimidazolone
5-amino-1-(2'-chlorophenyl)-benzimidazolone
5-amino-1-(2'-methoxyphenyl)-benzimidazolone
5-amino-1-(2'-methyl-4'-chlorophenyl)-benzimidazolone
5-amino-1-phenyl-6-chloro-benzimidazolone
5-amino-1-phenyl-7-chloro-benzimidazolone
5-amino-phenomorphol-(3)-one
6-amino-phenomorphol-(3)-one
6-amino-8-chlorophenomorphol-(3)-one
7-amino-phenomorphol-(3)-one
7-amino-6-chlorophenylmorphol-(3)-one
7-amino-6-methoxyphenomorphol-(3)-one
7-amino-6-methylphenomorphol-(3)-one
7-amino-4-methyl-2-hydroxyquinoline
7-amino-2-methyl-4-hydroxyquinoline
8-amino-4-hydroxyquinoline
8-amino-2-hydroxyquinoline
8-amino-6-methoxy-2-hydroxyquinoline
8-amino-2-methyl-4-hydroxyquinoline
5-amino-2,3-dihydroxyquinazoline
5-amino-7-chloro-2,3-dihydroxyquinazoline
5-amino-7-methyl-2,3-dihydroxyquinazoline
5-amino-2-methyl-4-hydroxyquinazoline
5-amino-2-phenyl-4-hydroxyquinazoline
5-amino-2-hydroxyquinazoline
6-amino-2-phenyl-4-hydroxyquinazoline
6-amino-2,3-dihydroxyquinazoline
7-amino-2,4-dihydroxyquinazoline
2-(4'-aminophenyl)-quinazol-4-one
2-(3'-amino-4'-chlorophenyl)-quinazol-4-one
2-(3'-amino-4'-methylphenyl)-quinazol-4-one
2-(3'-amino-4'-methoxyphenyl)-quinazol-4-one
4-(4'-aminophenylamino)-quinazol-2-one
4-(4'-amino-3'-chlorophenylamino)-quinazol-2-one
4-(4'-amino-3',6'-dimethoxyphenylamino)quinazol-2-one
4-(4'-amino-3'-chloro-6'-methoxyphenylamino)-quinazol-2-one As coupling components there are used preferably acetoacetic arylides of the formula

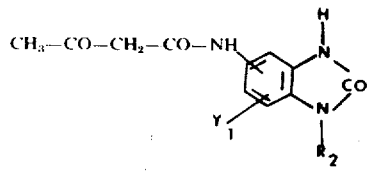

(IX)

wherein $Y_1$ has the meaning given hereinbefore and $R_2$ represents alkyl containing from 1 to 6 carbon atoms, cyclohexyl or phenyl which is optionally substituted by halogen, alkyl or alkoxy each containing from 1 to 6 carbon atoms.

The acetoacetic arylides to be used according to the invention are obtained, for example, by the addition of diketene to the corresponding heterocyclic amine.

The coupling takes place advantageously by gradual addition of the aqueous alkaline solution of the coupling component to the acid solution of the diazonium salt. The coupling is carried out advantageously at a pH of 4 to 6.

The pH is advantageously adjusted by addition of a buffer. Suitable buffers are, for example, the salts, in particular alkali salts, of formic acid, phosphoric acid or, especially, acetic acid. The alkaline solution of the coupling component contains advantageously a wetting, dispersing or emulsifying agent, for example an aralkylsulphonate, such as dodecylbenzenesulphonate or the sodium salt of 1,1'-naphthylmethanesulphonic acid, polycondensation products of alkylene oxides, such as the reaction product of ethylene oxide and p-tert.octylphenyl, also alkylesters of sulphoricinoleates, for example n-butylsulphoricinoleate. The dispersion of the coupling component may also with advantage contain protective colloids, for example methyl cellulose or small amounts of inert organic solvents which are insoluble or difficulty soluble in water, for example optionally halogenated or nitrated aromatic hydrocarbons, such as benzene, toluene, xylene, chlorobenzene, dichlorobenzenes or nitrobenzene, and aliphatic halogenated hydrocarbons such, for example, as carbon tetrachloride or trichloroethylene, also organic solvents which are miscible with water, for example, acetone, methyl ethyl ketone, methanol, ethanol or isopropanol, in particular dimethyl formamide.

It is also possible to carry out the coupling with advantage in such a manner that an acid solution of the diazonium salt is continuously combined with an alkaline solution of the coupling component in a mixing jet, when an immediate coupling of the components takes place. The resulting dyestuff dispersion is continually drawn off from the mixing jet and the dyestuff isolated by filtration.

Instead of the diazonium salt, it is also possible to use the correspondng diazoamino compounds. These are obtained by a process known in the art by coupling an aryldiazonium salt with a primary, or preferably with a secondary, amine. Amines of the most diverse kinds are suitable for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, butylaminoacetic acid, aminoethanesulphonic acid, methylaminoethanesulphonic acid, guanylethanesulphonic acid, β-aminoethylsulphuric acid, alicyclic amines, such as cyclohexylamine, N-methylcyclohexylamine, dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-amino-naphthalene-4-sulphonic acid, 1-aminonaphthalene-2,4-disulphonic acid, heterocyclic amines, such as piperidine, morpholine, pyrrolodine, dihydroindole and, finally, also sodium cyanamide or dicyandiamide.

As a rule, the diazoamino compounds obtained are difficulty soluble in water and can be isolated from the reaction medium in crystallised form, optionally after they have been salted out. In many cases, it is possible to use the moist press cakes for the further reaction. In particular cases, it may prove advisable to dehydrate the diazoamides prior to the reaction by means of vacuum drying.

The coupling of the diazoamino compound with the coupling component takes place in an organic solvent, for example chlorobenzene, o-dichlorobenzene, nitrobenzene, pyridine, ethylene glycol, ethylene glycol monoethyl or monomethyl ether, dimethyl formamide, formic acid or acetic acid. When using solvents which are miscible with water, it is not necessary to use the diazoamino compounds in anhydrous form. The aqueous-moist filter cakes may, for example, be used.

The coupling is advantageously carried out accompanied by the application of heat, preferably at temperatures between 80°to 180°C in acid medium, and proceeds as a rule very rapidly and completely. If neutral solvents are used, it is of advantage to add an acid, for example hydrochloric acid, sulphuric acid, formic acid or acetic acid. On account of their insolubility, the resulting pigments may be isolated from the reaction mixture by filtration. It is therefore unnecessary in most cases to subject them to an aftertreatment with organic solvents, as is a requisite in the case of pigments obtained by the aqueous coupling route.

The new colouring materials constitute valuable pigments which, in finely divided form, may be used for pigmenting organic material of high molecular weight, for example cellulose ethers and esters, superpolyamides and superpolurethanes or polyesters, acetyl cellulose, nitrocellulose, natural resins or artificial resins, such as polymerisation or condensation resins, for example aminoplasts, in particular urea and melamine/formaldehyde resins, alkyd resins, phenolic plastics, polycarbonates, polyolefines, such as polystyrene, polyvinyl chloride, polyethylene, polypropylene, polyacrylonitrile, polyacrylic esters, rubber, casein, silicon and silicon resins, individually or in mixtures.

It is immaterial whether the cited materials of high molecular weight are in the form of plastics, melts or in the form of spinning solutions, lacquers or printing inks. Depending on the use to which they are put, it is advantageous to use the new pigments as toners or in the form of preparations. The following Examples illustrate the invention, the parts and percentages being by weight unless otherwise stated.

EXAMPLE 1

1.985 Parts of 6-chloro-7-amino-phenomorphol-(3)-one are diazotised in the conventional manner, while cooling with ice, with 2.5 parts by volume of 10 N hydrochloric acid and 2.5 parts by volume of 4 N sodium nitrite solution. The diazo solution is filtered unti it becomes clear.

2.47 Parts of 1-methyl-5-acetoacetylaminobenzimidazolone are dissolved in 100 parts by volume of dimethyl formamide. Upon addition of 3.3 parts of anhydrous sodium acetate, the above diazo solution is added dropwise in about 15 minutes. The coupling mixture is stirred for several hours at room temperature, the pigment which has formed is filtered off, washed with hot water and methanol and dried. The product is obtained in the form of a brown, hard, granular substance, which is given its coloristically advantageous form by boiling it briefly in dimethyl formamide. The soft-grained, light yellow pigment colours PVC sheeting in a greenish yellow shade which is very fast to light and migration. The pigment has the formula

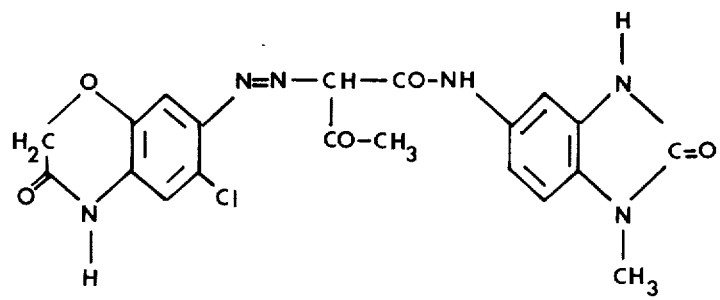

The following Table lists further pigments which are obtained by the same route if the diazo compound of the amine indicated in column I is coupled with the coupling component listed in column II. Column III indicates the shade of the resulting pigment in polyvinyl chloride.

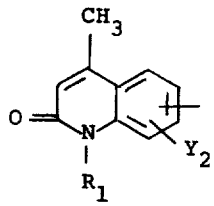
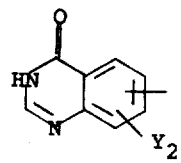

| | I | II | III |
|---|---|---|---|
| 1 | 4,6-dimethyl-7-amino-2-hydroxy-quinoline | 1-methyl-5-acetoacetyl-aminobenzimidazolone | reddish yellow |
| 2 | 4-methyl-7-amino-2-hydroxyquinoline | 1-methyl-5-acetoacetyl-aminobenzimidazolone | yellow |
| 3 | 6-methoxy-7-amino-phenomorphol-(3)-one | 1-methyl-5-acetoacetyl-aminobenzimidazolone | reddish yellow |
| 4 | 6-amino-quinazol-(4)-one | 1-methyl-5-acetoacetyl-aminobenzimidazolone | greenish yellow |
| 5 | 6-methyl-7-amino-phenomorphol-(3)-one | 1-methyl-5-acetoacetyl-aminobenzimidazolone | reddish yellow |
| 6 | 7-amino-phenomorphol-(3)-one | 1-methyl-5-acetoacetyl-aminobenzimidazolone | greenish yellow |
| 7 | 2-(4'-amino-phenyl)-quinazol-(4)-one | 1-methyl-5-acetoacetyl-aminobenzimidazolone | yellow |
| 8 | 2-(3'-amino-phenyl)-quinazol-(4)-one | 1-methyl-5-acetoacetyl-aminobenzimidazolone | yellow |
| 9 | 6-methyl-7-amino-phenomorphol-(3)-one | 1-ethyl-5-acetoacetyl-aminobenzimidazolone | reddish yellow |
| 10 | 6-methyl-7-amino-phenomorphol-(3)-one | 1-n-propyl-5-acetoacetylaminobenzimidazolone | orange |
| 11 | 6-methyl-7-amino-phenomorphol-(3)-one | 1-iso-propyl-5-acetoacetylaminobenzimidazolone | greenish yellow |
| 12 | 6-methyl-7-amino-phenomorphol-(3)-one | 1-n-butyl-5-acetoacetyl-aminobenzimidazolone | reddish yellow |
| 13 | 6-methyl-7-amino-phenomorphol-(3)-one | 1-phenyl-5-acetoacetyl-amino-benzimidazolone | greenish yellow |
| 14 | 6-methyl-7-amino-phenomorphol-(3)-one | 1-(4'-methyl-phenyl)-5-acetoacetylamino-benzimidazolone | greenish yellow |
| 15 | 6-chloro-7-amino-phenomorphol-(3)-one | 1-ethyl-5-acetoacetyl-amino-benzimidazolone | greenish yellow |
| 16 | 6-chloro-7-amino-phenomorphol-(3)-one | 1-n-propyl-5-acetoacetyl-amino-benzimidazolone | greenish yellow |
| 17 | 6-chloro-7-amino-phenomorphol-(3)-one | 1-iso-propyl-5-acetoacetyl-amino-benzimidazolone | greenish yellow |
| 18 | 6-chloro-7-amino-phenomorphol-(3)-one | 1-n-butyl-5-acetoacetyl-amino-benzimidazolone | orange |
| 19 | 6-chloro-7-amino-phenomorphol-(3)-one | 1-cyclohexyl-5-acetoacetyl-amino-benzimidazolone | greenish yellow |
| 20 | 6-chloro-7-amino-phenomorphol-(3)-one | 1-phenyl-5-acetoacetyl-amino-benzimidazolone | yellow |
| 21 | 6-chloro-7-amino-phenomorphol-(3)-one | 1-(3'-chloro-phenyl)-5-acetoacetylamino-benzimidazolone | brown |
| 22 | 6-chloro-7-amino-phenomorphol-(3)-one | 1-(4'-methyl-phenyl)-5-acetoacetylamino-benzimidazolone | yellow |

EXAMPLE 23

65 Parts of stabilised polyvinyl chloride, 35 parts of dioctyl phthalate and 0.2 part of the pigment obtained according to Example 1, paragraph 2, are stirred together and then worked to and fro for 7 minutes at 140°C on a two roll mill. There are obtained greenish yellow sheets having very good fastness to light and migration.

We claim:
1. An azo pigment of the formula

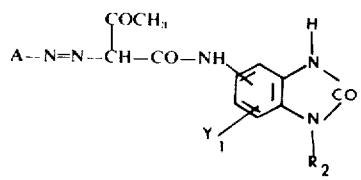

wherein A is an aryl selected from the group wherein $Y_1$ and $Y_2$ is hydrogen, chloro, bromo, alkyl of 1 to 6 carbon atoms, alkoxy of 1 to 6 carbon atoms or nitro, $R_1$ is hydrogen, alkyl of 1 to 6 carbon atoms, cyclohexyl, phenyl, or phenyl substituted by chloro, methyl or methoxy, $R_2$ is alkyl of 1 to 6 carbon atoms, cyclohexyl, phenyl, or phenyl substituted by chloro, alkyl of 1 to 6 carbon atoms, or alkoxy of 1 to 6 carbon atoms.

2. The azo pigment according to claim 1 of the formula

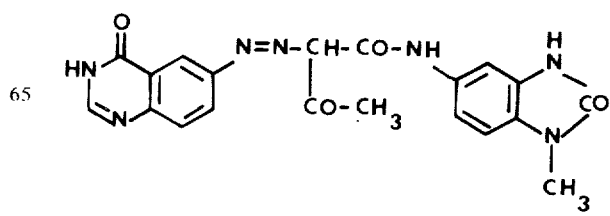

3. The azo pigment according to claim 1 of the formula
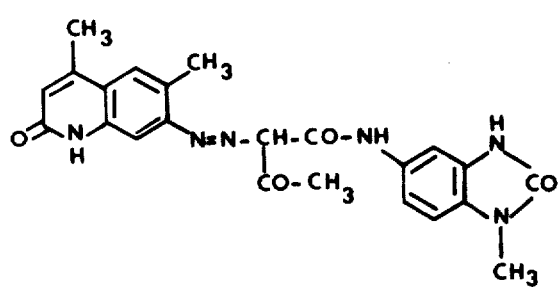
4. The azo pigment according to claim 1 of the formula
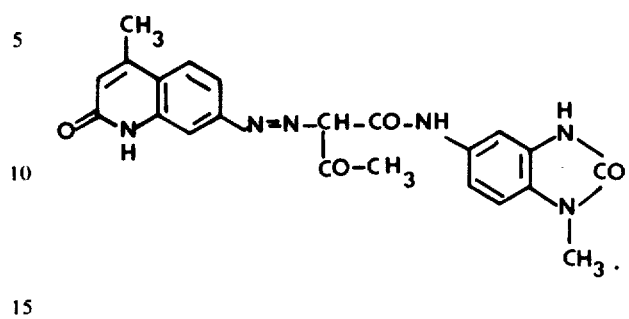
* * * * *